US012640440B2

(12) United States Patent (10) Patent No.: US 12,640,440 B2
Hwang et al. (45) Date of Patent: May 26, 2026

(54) BATTERY CELL AND BATTERY MODULE INCLUDING THE SAME

(71) Applicant: SK On Co., Ltd., Seoul (KR)

(72) Inventors: Chang Mook Hwang, Daejeon (KR); Jong Hyeok Lee, Daejeon (KR); Yoon Ji Jo, Daejeon (KR)

(73) Assignee: SK On Co., Ltd., Seoul (KR)

( * ) Notice: Subject to any disclaimer, the term of this patent is extended or adjusted under 35 U.S.C. 154(b) by 724 days.

(21) Appl. No.: 18/094,453

(22) Filed: Jan. 9, 2023

(65) Prior Publication Data

US 2023/0223631 A1 Jul. 13, 2023

(30) Foreign Application Priority Data

Jan. 10, 2022 (KR) ........................ 10-2022-0003559

(51) Int. Cl.
H01M 50/474 (2021.01)
H01M 10/04 (2006.01)
(Continued)

(52) U.S. Cl.
CPC ..... H01M 50/474 (2021.01); H01M 10/0413 (2013.01); H01M 10/0436 (2013.01); H01M 10/0463 (2013.01); H01M 10/0468 (2013.01); H01M 10/0481 (2013.01); H01M 10/0486 (2013.01); H01M 10/0585 (2013.01); H01M 10/647 (2015.04); H01M 10/6555 (2015.04); H01M 50/103 (2021.01); H01M 50/105 (2021.01); H01M 50/178 (2021.01); H01M 50/211 (2021.01); H01M 50/242 (2021.01);

H01M 50/291 (2021.01); H01M 50/293 (2021.01); H01M 50/477 (2021.01); H01M 50/483 (2021.01); H01M 50/486 (2021.01)

(58) Field of Classification Search
None
See application file for complete search history.

(56) References Cited

U.S. PATENT DOCUMENTS 6,855,455 B1 * 2/2005 Berger .................. H01M 50/46
429/246
8,546,007 B2 10/2013 Lee et al.
(Continued)

FOREIGN PATENT DOCUMENTS

| GB | 2570300 A | * | 7/2019 | ......... H01M 50/211 |
| KR | 1020130115425 A | | 10/2013 | |
| KR | 1020160056073 A | | 5/2016 | |
| KR | 1020170095604 A | | 8/2017 | |
| KR | 1020180044083 A | | 5/2018 | |

*Primary Examiner* — Gregg Cantelmo
(74) *Attorney, Agent, or Firm* — The Webb Law Firm

(57) ABSTRACT

A battery cell includes a casing provided with an accommodation space; and an electrode assembly accommodated in the accommodation space and contacting the casing. The electrode assembly may include a negative electrode including a first current collector and a negative electrode mixture applied to the first current collector; a positive electrode including a second current collector and a positive electrode mixture applied to the second current collector; a separator interposed between the positive electrode and the negative electrode; and a guide member accommodating at least one of the negative electrode and the positive electrode and pressurized or stretched by at least one of the negative electrode and the positive electrode to contract or expand.

16 Claims, 7 Drawing Sheets

(51) Int. Cl.

| | |
|---|---|
| *H01M 10/0585* | (2010.01) |
| *H01M 10/647* | (2014.01) |
| *H01M 10/6555* | (2014.01) |
| *H01M 50/103* | (2021.01) |
| *H01M 50/105* | (2021.01) |
| *H01M 50/178* | (2021.01) |
| *H01M 50/211* | (2021.01) |
| *H01M 50/242* | (2021.01) |
| *H01M 50/291* | (2021.01) |
| *H01M 50/293* | (2021.01) |
| *H01M 50/477* | (2021.01) |
| *H01M 50/483* | (2021.01) |
| *H01M 50/486* | (2021.01) |

(56) References Cited

U.S. PATENT DOCUMENTS

| | | | |
|---|---|---|---|
| 10,923,697 B2 | 2/2021 | Kim et al. | |
| 2012/0021264 A1* | 1/2012 | Morishima | H01M 10/0587 |
| | | | 29/623.5 |
| 2016/0133885 A1 | 5/2016 | Sakashita et al. | |
| 2016/0372800 A1* | 12/2016 | Kanada | H01M 10/44 |
| 2018/0114961 A1 | 4/2018 | Kim et al. | |
| 2018/0159103 A1* | 6/2018 | Naoe | H01M 50/417 |
| 2019/0296289 A1* | 9/2019 | Yamamoto | H01M 10/0481 |
| 2019/0326562 A1 | 10/2019 | Ota et al. | |
| 2021/0043882 A1 | 2/2021 | Jang et al. | |

* cited by examiner

200

140 {141, 142}

BATTERY CELL AND BATTERY MODULE INCLUDING THE SAME

CROSS-REFERENCE TO RELATED APPLICATION

This application claims priority to Korean Patent Application No. 10-2022-0003559 filed Jan. 10, 2022, the disclosure of which is hereby incorporated by reference in its entirety.

BACKGROUND OF THE INVENTION

Field of the Invention

The present disclosure relates to a battery cell and a battery module including the same.

Description of Related Art

Secondary batteries may be charged with and discharged of electricity and may be applied to devices within various fields such as mobile electronic devices having relatively small sizes to vehicles and power storage devices having medium and large sizes. Among such secondary batteries, lithium secondary batteries have advantages in high operating voltage and energy density per unit weight, a high charging speed, and ease of weight reduction.

A lithium secondary battery has a form in which an electrode assembly including a negative electrode, a positive electrode, and a separator interposed therebetween is accommodated in an external material and an electrolyte is injected. The external material may have various shapes such as a pouch shape, a prismatic shape, and a circular shape.

The negative electrode and the positive electrode of the lithium secondary battery may be formed by coating a slurry containing an electrode active material, a binder, a conductive material, and the like, on a surface of a current collector. While such a lithium secondary battery is repeatedly charged and discharged, an electrode active material or particles constituting the electrode active material may repeatedly expand and contract due to an electrochemical action of lithium ions.

Although the amount of expansion and contraction of the negative electrode and the positive electrode varies depending on the type of an electrode active material, the repeated expansion and contraction of the negative electrode and the positive electrode may cause deformation of an external material accommodating an electrode assembly.

Accordingly, currently, when a secondary battery module and a second battery pack are configured, a pad for absorbing expansion of a negative electrode and a positive electrode may be sandwiched between the external materials to address the above issues. However, such a method may reduce assembly efficiency of a secondary battery module and a second battery pack.

PRIOR ART DOCUMENTS

Patent Document (Patent Document 1) Korean Patent Publication No. 10-2013-0115425 A (Oct. 22, 2013)

SUMMARY OF THE INVENTION

An aspect of the present disclosure is to improve assembly efficiency of a battery cell and assembly efficiency of a battery module and a battery pack.

Another aspect of the present disclosure is to control expansion and contraction of an electrode inside a casing in which the electrode is accommodated.

Another aspect of the present disclosure is to prevent an exterior of an external material, accommodating an electrode assembly, from being deformed even when charging and discharging are repeated.

According to an aspect of the present disclosure, a battery cell includes: a casing having an accommodation space; and an electrode assembly accommodated in the accommodation space and contacting the casing. The electrode assembly may include: a negative electrode including a first current collector and a negative electrode mixture applied to the first current collector; a positive electrode including a second current collector and a positive electrode mixture applied to the second current collector; a separator interposed between the positive electrode and the negative electrode; and a guide member accommodating at least one of the negative electrode and the positive electrode and pressurized or stretched by at least one of the negative electrode and the positive electrode to contract or expand.

The guide member may include: a first guide member accommodating the negative electrode; and a second guide member accommodating the positive electrode, and the separator may be disposed between the first guide member and the second guide member.

The first guide member may have a first accommodation groove in which the negative electrode is accommodated, the second guide member may have a second accommodation groove in which the positive electrode is accommodated, and the first guide member and the second guide member may have at least one surface contacting each of the negative electrode and the positive electrode.

The first guide member and the second guide member may include a plurality of first accommodation grooves and a plurality of second accommodation grooves, respectively. The negative electrode and the positive electrode may be provided with a plurality of negative electrodes and a plurality of positive electrodes corresponding to the first accommodation groove and the second accommodation groove in one-to-one correspondence to be accommodated in the first accommodation groove and the second accommodation groove, respectively.

The first guide member may include: a first support portion to which the first current collector is attached; and a first expansion portion extending from the first support portion in a thickness direction of the negative electrode. The second guide member may include: a second support portion to which the second current collector is attached; and a second expansion portion extending from the second support portion in a thickness direction of the positive electrode.

The first current collector may be provided with a plurality of first current collectors to respectively be attached to opposite surfaces of the first support portion, and the second current collector may be provided with a plurality of second current collectors to respectively be attached to opposite surfaces of the second support portion.

The first expansion portion may extend from each of one side and the other side of the first support portion in a thickness direction of the negative electrode, and the second expansion portion may extend from each of one side and the other side of the second support portion in a thickness direction of the positive electrode.

The first guide member may further include a first lower support portion supporting a lower portion of the negative electrode, and the second guide member may further include a second lower support portion supporting a lower portion of the positive electrode.

Length values of the first guide member and the second guide member in a width direction of the negative electrode may be the same, and maximum thickness values of the first guide member and the second guide member in a thickness direction of the negative electrode may be the same.

The guide member may include low-density conductive plastic.

The guide member may be formed of a material including conductive plastic having porosity of 50% or more to 70% or less.

The guide member may be formed of a material including polyacetylene.

The guide member may include a carbon-based filler.

According to another aspect of the present disclosure, a battery module includes: a module housing; and a battery cell accommodated in the module housing and including a casing provided with an accommodation space and an electrode assembly accommodated in the accommodation space and contacting the casing, the electrode assembly comprising a negative electrode including a first current collector and a negative electrode mixture applied to the first current collector, a positive electrode including a second current collector and a positive electrode mixture applied to the second current collector, a separator interposed between the positive electrode and the negative electrode, and a guide member accommodating at least one of the negative electrode and the positive electrode and pressurized or stretched by at least one of the negative electrode and the positive electrode to contract or expand.

The battery cell may be provided with a plurality of battery cells to be stacked in the module housing, and may be supported by the module housing.

The battery module may further include: at least one pad disposed between the battery cells and contacting the battery cell.

The casing of the battery cell may be a pouch-type casing.

The pad may be formed of a material having thermal conductivity of 1 W/mK or more to 20 W/mK or less.

BRIEF DESCRIPTION OF THE DRAWINGS

The above and other aspects, features, and advantages of the present disclosure will be more clearly understood from the following detailed description, taken in conjunction with the accompanying drawings.

DESCRIPTION OF THE INVENTION

Figure 1:
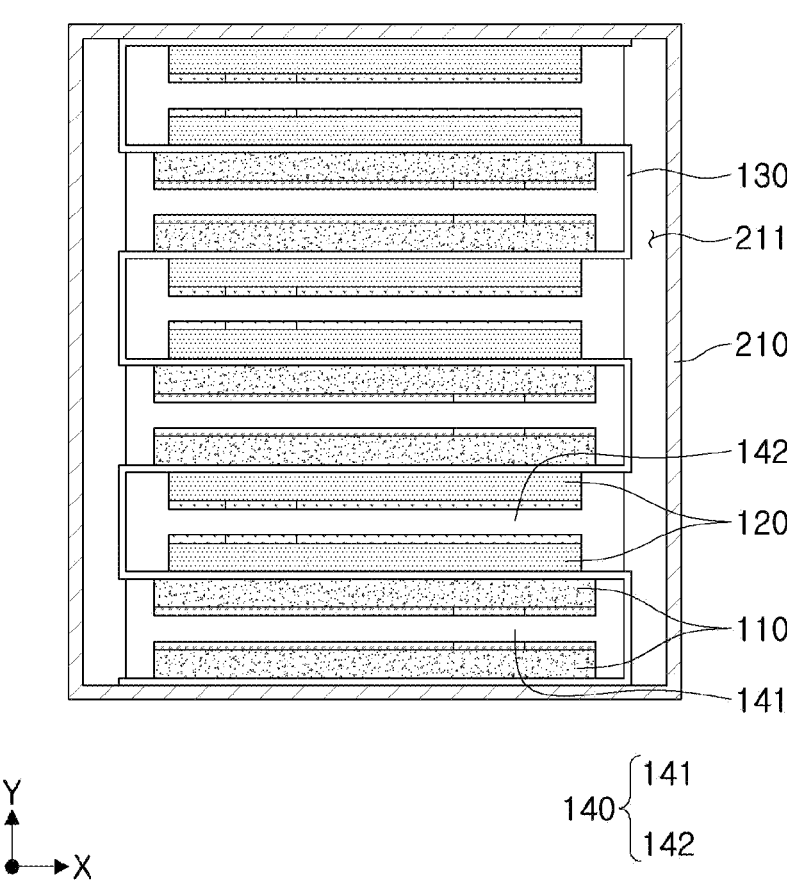
FIG. 1 is a cross-sectional view of a battery cell according to an exemplary embodiment in the present disclosure.

In order to facilitate an understanding of the description of the exemplary embodiment of the present disclosure, the same reference numerals are used for the same elements in the accompanying drawings, and related elements among elements performing the same function in each exemplary embodiment are denoted by the same number or the number of extension.

Further, in order to clarify the gist of the present disclosure, a description of elements and techniques well known in the prior art will be omitted, and the present disclosure will be described in detail with reference to the accompanying drawings.

It is to be understood, however, that the spirit and scope of the present disclosure are not limited to the exemplary embodiments illustrated, but other forms may be suggested by those skilled in the art while specific components are added, changed, and deleted, which also included within the scope of the same idea as the present disclosure.

Hereinafter, an X-axis illustrated in the accompanying drawings is a direction, parallel to a width direction of a secondary battery, a Y-axis is a direction, parallel to a thickness direction of the secondary battery, and a Z-axis is a direction, parallel to a height direction of the secondary battery.

FIG. 1 is a cross-sectional view of a battery cell 200 according to an exemplary embodiment.

As illustrated in FIG. 1, the battery cell 200 according to an exemplary embodiment may include a casing 210 forming an exterior, and a negative electrode 110 and a positive electrode 120, accommodated in an accommodation space 211 of the casing 210, and a separator 130 interposed between the negative electrode 110 and the positive electrode 120.

In an exemplary embodiment, each of the negative electrode 110 and the positive electrode 120 may be attached to a guide member 140, and a plurality of guide members 140 may be stacked in the accommodation space 211. In this case, the separator 130 may also be interposed between the plurality of guide members 140.

A single separator 130 maybe interposed between each negative electrode 110 and each positive electrode 120 and between respective guide members 140 in a zigzag pattern. The separator 130 may be in contact with an internal surface of the casing 210.

An electrolyte may fill the accommodation space 211 in which the negative electrode 110, the positive electrode 120, the separator 130, and the guide member 140 are accommodated.

A cross-section of the casing 210 is illustrated as having a rectangular shape for ease of description, but the shape of the cross-section of the casing 210 is not limited thereto and may be appropriately changed and applied by a usage environment of the battery cell 200, required specifications of the battery cell 200, and/or the like.

In an exemplary embodiment, the battery cell 200 may be a prismatic or cylindrical battery cell. The casing 210 of the prismatic or cylindrical battery cell may be formed of a material including aluminum, and a cross-section thereof may have a prismatic or circular shape. In this case, the casing 210 may have a predetermined level of rigidity. Although the casing 210 having a rectangular cross-sectional shape is illustrated in FIG. 1, the cross-section of the casing 210 may be circular when the battery cell 200 is cylindrical.

In an exemplary embodiment, the first guide member 141 may accommodate the negative electrode 110, and the second guide member 142 may accommodate the positive electrode 120. The first guide member 141 and the second guide member 142 may be formed of a material having elasticity. Accordingly, when the negative electrode 110 and the positive electrode 120 expand, the first guide member 141 and the second guide member 142 may be pressurized by the negative electrode 110 and the positive electrode 120 to contract. In this case, the first guide member 141 and the second guide member 142 may expand and contract by the amounts of expansion and contraction of the negative electrode 110 and the positive electrode 120.

When the negative electrode 110 and the positive electrode 120 expand, the first guide member 141 and the second guide member 142 may contract by the amount of expansion of the negative electrode 110 and the positive electrode 120, and the negative electrode 110. On the other hand, when the negative electrode 110 and the positive electrode 120 contract, the first guide member 141 and the second guide member 142 may expand by the amount of contraction of the negative electrode 110 and the positive electrode 120.

Accordingly, the casing 210 may not be affected by a change in the thicknesses of the negative electrode 110 and the positive electrode 120, and the casing 210 may not be deformed even when the thicknesses of the negative electrode 110 and the positive electrode 120 are changed.

Accordingly, when a battery module or a battery pack is configured by providing a plurality of prismatic or cylindrical battery cells 200, an additional member dealing with a change in the thickness of the casing 210 of the battery cell 200 does not need to be provided inside a module housing (not illustrated) or a pack housing (not illustrated) accommodating the battery cells 200.

This is because the battery cell 200 according to an exemplary embodiment may deal with a change in the thickness of at least one of the negative electrode 110 and the positive electrode 120 inside the casing 210. Therefore, materials required for assembly to configure a battery module (not illustrated) or a battery pack (not illustrated) may be significantly reduced, and assembly efficiency may be improved.

Figure 2:
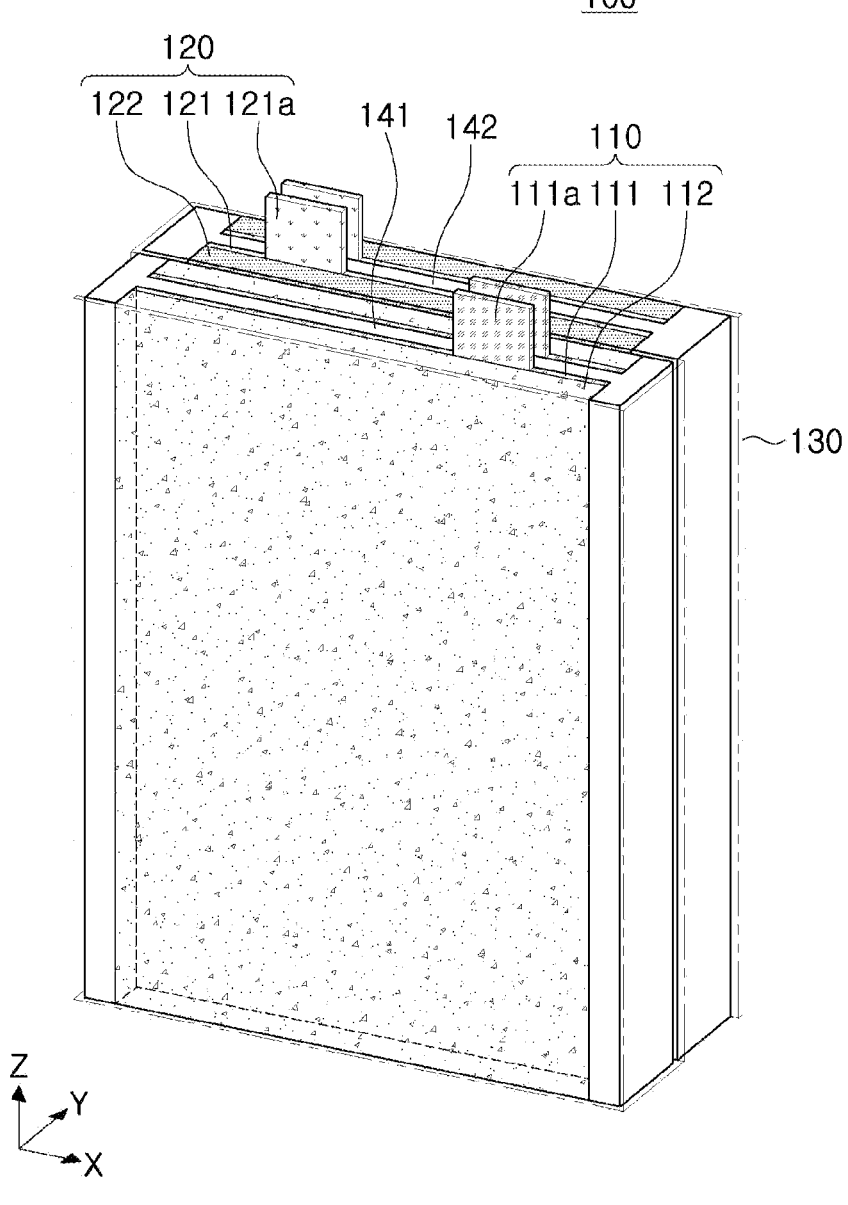
FIG. 2 is a perspective view of an electrode assembly of a battery cell according to an exemplary embodiment in the present disclosure.

FIG. 2 is a perspective view of the electrode assembly 100 according to an exemplary embodiment.

As illustrated in FIG. 2, the electrode assembly 100 according to an exemplary embodiment may include a plurality of negative electrodes 110 in contact with opposite surfaces of a first guide member 141, a plurality of positive electrodes 120 in contact with opposite surfaces of a second guide member 142, and a separator 130 separating the negative electrode 110 and the positive electrode 120 from each other. The separator 130 may also separate the first guide member 141 and the second guide member 142 from each other.

The electrode assembly 100 may be provided in plurality in the accommodation space (211 of FIG. 1) of the casing (210 of FIG. 1), and the plurality of electrode assemblies 100 may be stacked in the accommodation space (211 of FIG. 1) of the casing 210. In this case, a single separator is allowed to pass between the negative electrode 110 and the positive electrode 120 and between the first guide member 141 and the second guide member 142 in a zigzag pattern, so that the separator 130 may implement a jelly-roll type electrode assembly 110. However, this is not limited thereto and may be appropriately changed and applied by a usage environment of the electrode assembly 100, and required specifications of the electrode assembly 100, and/or the like.

At least one of the first guide member 141 and the second guide member 142 may contract or expand due to expansion or contraction of at least one of the negative electrode 110 and the positive electrode 120. At least one of the negative electrode 110 and the positive electrode 120 may expand or contract as the battery cell is charged or discharged.

In an exemplary embodiment, the negative electrode 110 may include a first current collector 111 and a negative electrode mixture 112 applied to the first current collector 111. The negative electrode mixture 112 may be applied to a region, other than an uncoated region 111*a* of the first current collector 111. The first current collector 111 may be adhered to the first guide member 141 by an adhesive.

In an exemplary embodiment, the positive electrode 120 may include a second current collector 121 and a positive electrode mixture 122 applied to the second current collector 121. The positive electrode mixture 122 may be applied to a region, other than an uncoated region 121*a* of the second current collector 121. The second current collector 121 may be adhered to the second guide member 142 by an adhesive.

The type of the adhesive is not limited as long as the adhesive is an adhesive having electrical conductivity. The adhesive may serve to firmly couple the negative electrode 110 to the first guide member 141 and to firmly couple the positive electrode 120 to the second guide member 142.

The expansion and contraction of the negative electrode 110 may occur due to the expansion and contraction of the negative electrode mixture 112, and the expansion and contraction of the positive electrode 120 may occur due to the expansion and contraction of the positive electrode mixture 112.

Since the negative electrode mixture 112 and the positive electrode mixture 122 are in the form of a slurry, expansion and contraction deformation may occur in the first current collector 111 and the second current collector 121.

When the negative electrode mixture 112 and the positive electrode mixture 122 expand, the first and second current collectors 111 and 121 may attract the first and second guide members 141 and 142, respectively, resulting in volume expansion of the first and second guide members 141 and 142.

Meanwhile, when the negative electrode mixture 112 and the positive electrode mixture 122 contract, the first and second current collectors 111 and 121 may pressurize the first and second guide members 141 and 142, respectively, resulting in volume contraction of the first and second guide members 141 and 142. Since the first guide member 141 and the second guide member 142 include a material having elasticity, such a volume change may occur.

In an exemplary embodiment, the first guide member 141 and the second guide member 142 may be formed of a material including low-density conductive plastic. The low-density conductive plastic may be a low-density conductive resin. A low-density plastic material has flexible properties, and thus, may facilitate elastic behavior.

In addition, in an exemplary embodiment, the first guide member 141 and the second guide member 142 may be formed of a material including conductive plastic having a porosity of 50% or more to 70% or less.

Pores, present in the first guide member 141 and the second guide member 142, may serve as a path along which an electrolyte of an electrolyte solution impregnated in an electrode assembly is moved when a battery cell is configured. In addition, the pores serve to enable expansion and contraction deformation of the first guide member 141 and the second guide member 142.

When the porosity of the first guide member 141 and the second guide member 142 is 50% or more to 70% or less, an elastic behavior of the first guide member 141 and the second guide member 142 may be facilitated while preventing durability of the first guide member 141 and the second guide member from deteriorating.

In addition, in an exemplary embodiment, the first guide member 141 and the second guide member 142 may be formed of a material containing polyacetylene. The polyacetylene may be iodized to have electrical conductivity, and a carbon-based filler may be mixed therewith to further improve electrical conductivity.

In this case, when the porosity of the first guide member 141 and the second guide member 142 is 50% or more to 70% or less, the electrical conductivity of the first guide member 141 and the second guide member 142 may be prevented from deteriorating.

In addition, when the porosity of the first guide member 141 and the second guide member 142 is 50% or more to 70% or less, a behavior of expanding or contracting the negative electrode 110 and the positive electrode 120 by the first guide member 141 and the second guide member 142 may be facilitated.

However, when the porosity is less than 50%, electrical conductivity may be significantly deteriorated, and facilitation of the elastic behavior of the first guide member 141 and the second guide member 142 may be relatively reduced. Accordingly, ability of allowing the first guide member 141 and the second guide member 142 to be expanded or contracted by the negative electrode 110 and the positive electrode 120 may be reduced.

In addition, when the porosity is greater than 70%, the rigidity of the first guide member 141 and the second guide member 142 may be relatively reduced, and it may be difficult to maintain shapes of the first guide member 141 and the second guide member 142.

In an exemplary embodiment, the first guide member 141 and the second guide member 142 may be formed of conductive plastic including a carbon-based filler.

In an exemplary embodiment, the carbon-based filler may be carbon black (CB), carbon fiber (CF), carbon nanotubes (CNT), or the like.

When the negative electrode 110 and the positive electrode 120 expand due to charging of the battery cell (200 of FIG. 1), the first guide member 141 and the second guide member 142 may contract by the amount of expansion of the negative electrode 110 and the positive electrode 120.

When the negative electrode 110 and the positive electrode 120 contract due to discharging of the battery cell (200 of FIG. 1), the first guide member 141 and the second guide member 142 may expand by the amount of contraction of the negative electrode 110 and the positive electrode 120. However, only one of the negative electrode 110 and the positive electrode 120 may expand or contract due to charging or discharging of the battery cell (200 of FIG. 1). In this case, the guide member (140 of FIG. 1), to which the expanding or contracting electrode is attached, may expand or contract.

According to the above-described present disclosure, a total thickness of the electrode assembly 100 in a Y-axis direction may have the same value in a state in which charging and discharging are completed. In addition, a thickness of the electrode assembly 100 in the Y-axis direction in a state in which the battery cell (200 of FIG. 1) is fully charged may have the same value as a thickness of the electrode assembly 100 in the Y-axis direction in a state in which the battery cell (200 of FIG. 1) is fully discharged. This may contribute to preventing the casing (210 of FIG. 1) of the battery cell (200 of FIG. 1) from being deformed in the Y-axis direction.

In an exemplary embodiment, external peripheries of the first guide member 141 and the second guide member 142 may have the same length of the negative electrode 110 in a width direction, for example, in the X-axis direction. Accordingly, when only an alignment operation is performed such that the external peripheries of the first guide member 141 and the second guide member 142 are aligned on the same line in the Y-axis direction, an additional alignment operation of the negative electrode 110 and the positive electrode 120 does not need to be performed. Furthermore, the negative electrode 110 and the positive electrode 120 may be prevented from being staggered from each other in the X-axis direction. Accordingly, the assembly efficiency of the electrode assembly 100 may be improved, and productivity may be improved.

Figure 3:
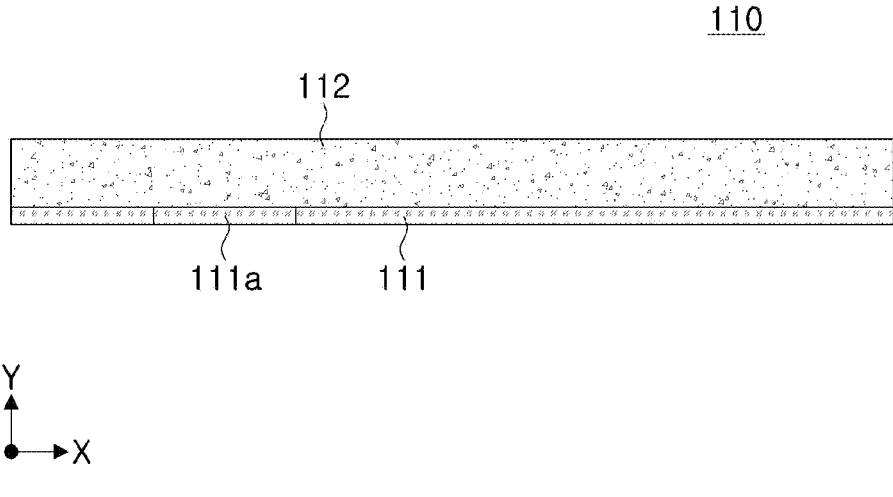
FIG. 3 is a plan view of a negative electrode according to an exemplary embodiment in the present disclosure.

FIG. 3 is a plan view of the negative electrode 110 according to an exemplary embodiment.

As illustrated in FIG. 3, the negative electrode 110 may include a first current collector 111 and a negative electrode mixture 112 applied to the first current collector 111. In this case, the first current collector 111 may be adhered to the first guide member (141 of FIG. 2).

The first current collector 111 may be formed of a material including copper, gold, stainless steel, nickel, aluminum, titanium, or alloys thereof.

The negative electrode mixture 112 is applied to the first current collector 111 and may be in the form of a slurry in which a negative electrode active material, a binder, a conductive material, a dispersant, and the like, are mixed and stirred. The negative electrode mixture 112 may be applied to the first current collector 111, and may then be compressed and dried. The negative electrode mixture 112 may be applied to a region, other than an uncoated region 111a of the first current collector 111.

A thickness of the first current collector 111 in a direction, parallel to a Y-axis, and a thickness of the negative electrode mixture 112 applied to the first current collector 111 in a direction, parallel to the Y-axis, may be appropriately selected and applied by a usage environment of an electrode assembly (100 of FIG. 2), required specifications of the electrode assembly, and/or the like.

Figure 4:
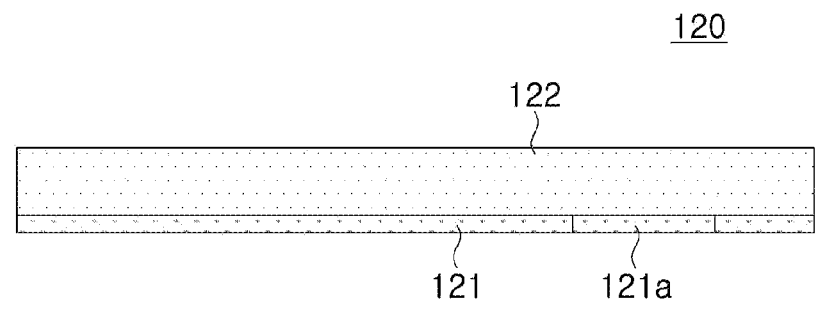
FIG. 4 is a plan view of a positive electrode according to an exemplary embodiment in the present disclosure.
Figure 4:
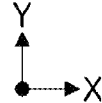

FIG. 4 is a plan view of the positive electrode 120 according to an exemplary embodiment.

As illustrated in FIG. 4, the positive electrode 120 may include a second current collector 121 and a positive electrode mixture 122 applied to the second current collector 121. In this case, the second current collector 121 may be adhered to a second guide member (142 of FIG. 2).

The second current collector 121 may be formed of a material including aluminum, stainless steel, nickel, titanium, copper, or alloys thereof.

The positive electrode mixture 122 is applied to the second current collector 121 and may be in the form of a slurry in which a positive electrode active material, a binder, a conductive material, a dispersant, and the like, are mixed and stirred. The positive electrode mixture 122 may be applied to each of one surface and the other surface of the positive electrode current collector, and may then be pressurized and dried. The positive electrode mixture 122 may be applied to a region, other than an uncoated region 121a of the second current collector 121.

The positive electrode active material may include a compound reversibly intercalating and deintercalating lithium ions.

Figure 5:
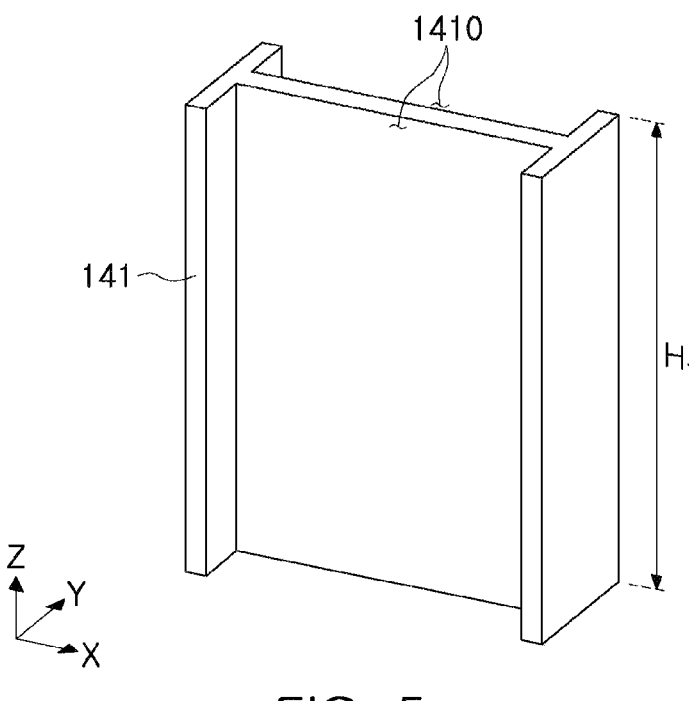
FIG. 5 is a perspective view of a first guide member according to an exemplary embodiment in the present disclosure.

FIG. 5 is a perspective view of the first guide member 141 according to an exemplary embodiment. In an exemplary embodiment, the guide member may include a first guide member 141 accommodating a negative electrode (110 of FIG. 2).

The first guide member 141 may include a first accommodation groove 1410 accommodating a negative electrode (110 of FIG. 2). The first accommodation groove 1410 may be formed on each of one surface and the other surface of the first guide member 141, and the negative electrode (110 of FIG. 2) may be accommodated in each of a plurality of first accommodation grooves 1410.

A length of the first accommodation groove 1410 in an X-axis direction may be at least equal to a length of the negative electrode (110 of FIG. 2) in a direction, parallel to an X-axis. A length of the first guide member 141 in a Z-axis direction may be at least equal to a length of the separator (130 of FIG. 2) in the Z-axis direction.

In an exemplary embodiment, the first accommodation groove 1410 and the negative electrode (110 of FIG. 2) may be provided to have a loose fitting tolerance or an intermediate fitting tolerance. Accordingly, assembling of the negative electrode (110 of FIG. 2) is completed by simply inserting the negative electrode (110 of FIG. 2) into the first accommodation groove 1410, so that the assembly efficiency of the electrode assembly (100 of FIG. 1) may be improved.

Figure 6:
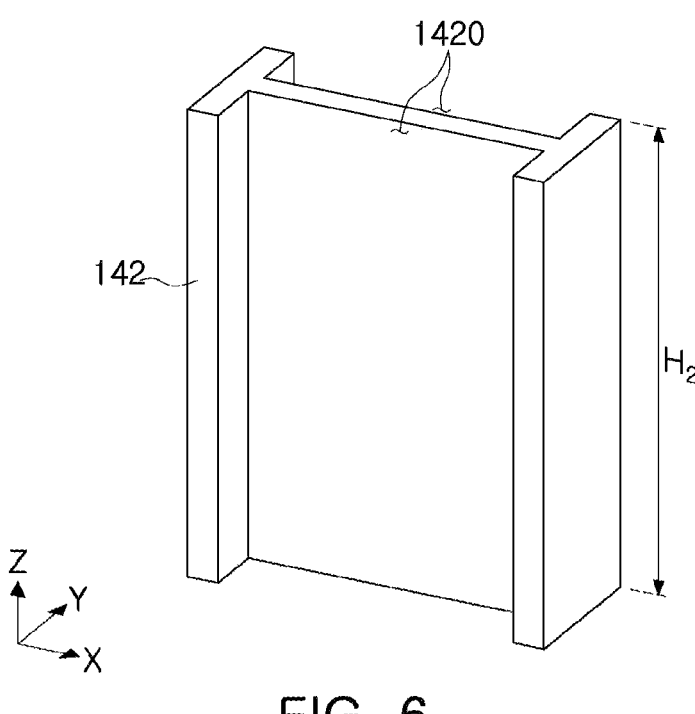
FIG. 6 is perspective view of a second guide member according to an exemplary embodiment in the present disclosure.

FIG. 6 is a perspective view of the second guide member 142 according to an exemplary embodiment. In an exemplary embodiment, the guide member may include a second guide member 142 accommodating the positive electrode (120 of FIG. 2).

The second guide member 142 may include a second accommodation groove 1420 in which the positive electrode (120 of FIG. 2) is accommodated. The second accommodation groove 1420 may be formed on each of one surface and the other surface of the second guide member 142, and the positive electrode (120 of FIG. 2) may be accommodated in each of a plurality of second accommodation grooves 1420.

A length of the second accommodation groove 1420 in an X-axis direction may be at least the same as a length of the positive electrode (120 of FIG. 2) in the X-axis direction. A length of the second guide member 142 in a Z-axis direction may be at least the same as a length of the separator (130 of FIG. 2) in the Z-axis direction.

In an exemplary embodiment, the second accommodation groove 1420 and the positive electrode (120 of FIG. 2) may be provided to have a loose fitting tolerance or an intermediate fitting tolerance. Accordingly, assembling of the positive electrode (120 of FIG. 2) is completed by simply inserting the positive electrode (120 of FIG. 2) into the second accommodation groove 1420, so that assembly efficiency of the electrode assembly (100 of FIG. 2) may be improved.

A length of the second accommodation groove 1420 in the X-axis direction may be smaller than a length of the first accommodation groove 1410 of FIG. 5 in the X-axis direction. This is because the length of the positive electrode (120 of FIG. 2) in the X-axis direction is generally smaller than the length of the negative electrode (110 of FIG. 2) in the X-axis direction. However, as described above, a length of an external periphery of the first guide member (141 of FIG. 5) in the X-axis direction is the same as a length of an external periphery of the second guide member 142 in the X-axis direction.

Figure 7:
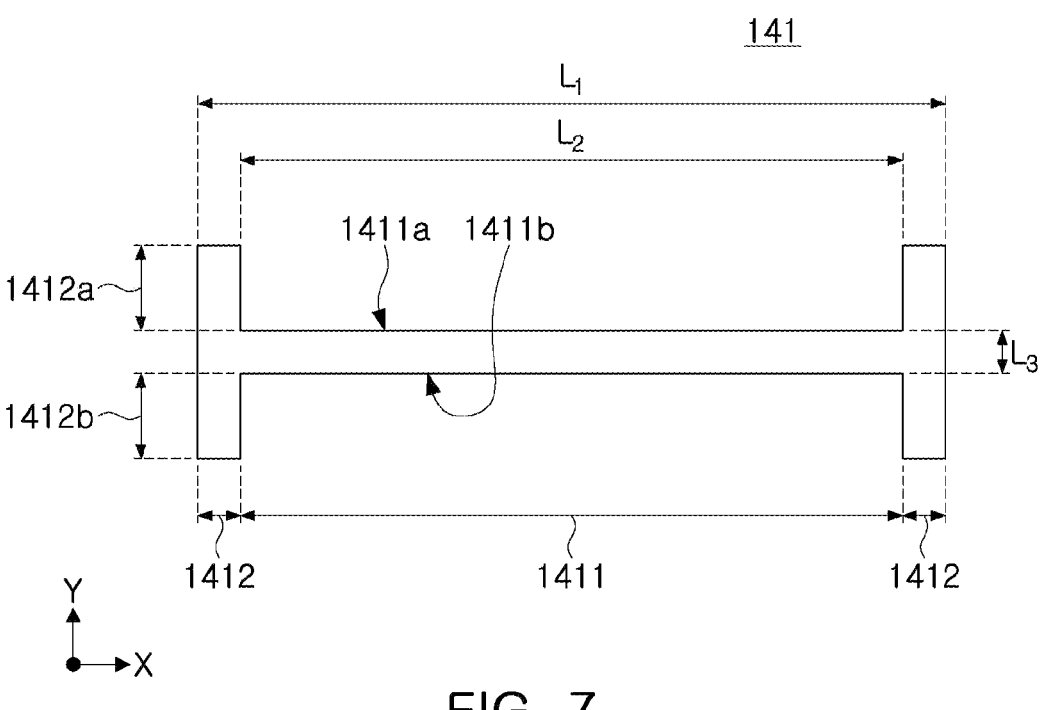
FIG. 7 is a plan view of a first guide member according to an exemplary embodiment in the present disclosure.

A plan view of the first guide member 141 is illustrated in FIG. 7.

As illustrated in FIG. 7, the first guide member 141 according to an exemplary embodiment may include a first support portion 1411, to which the first current collector (111 of FIG. 3) is attached, and a plurality of first expansion portions 1412 extending from the first support portion 1411.

The plurality of first expansion portions 1412 may extend from one end portion and the other end portion of the first support portion 1411 in a thickness direction of the negative electrode (110 of FIG. 3), respectively.

In an exemplary embodiment, one first current collector (111 of FIG. 3) may be attached to the first surface 1411a of the first support portion 1411, and another first current collector (111 of FIG. 3) may be attached to the second surface 1411b of the first supporting portion 1411.

In an exemplary embodiment, the first expansion portion 1412 extending from one end portion of the first support portion 1411 may include a first extension portion 1412a, extending from the first support portion 1411 in a positive Y-direction, and a second extension portion 1412b extending from the first support portion 1411 in a negative Y-direction. This is a matter which may be equally applied to another first extension 1412 extending from the other end portion of the first support 1411.

In an initial stage, a stage before volume deformation of the electrode assembly (100 of FIG. 2), an absolute value of a length of the first extension portion 1412a in the Y-axis direction and a length of the second extension portion 1412b in a Y-axis direction may be equal to a sum of a thickness of the first current collector (111 of FIG. 3) and a thickness of the negative electrode mixture (112 of FIG. 3).

A thickness of the first current collector (111 of FIG. 3) attached to the first surface 1411a of the first support portion 1411 and a thickness of the first current collector (111 of FIG. 3) attached to the second surface 1411b of the first support portion 1411 may be equal to each other, and thicknesses of the negative electrode mixture (112 of FIG. 3) applied to the respective first current collector (111 of FIG. 3) may also be equal to each other.

Therefore, the first extension portion 1412a and the second extension portion 1412b may be in continuous contact with the first current collector (111 of FIG. 3) and the negative electrode mixture (112 of FIG. 3). Accordingly, a contact surface between the first guide member 141 and the negative electrode (110 of FIG. 3) may be increased, and binding force between the first guide member 141 and the negative electrode (110 in FIG. 3) may be enhanced. In addition, the expansion and contraction of the negative electrode mixture (112 in FIG. 3) may be more easily dealt with.

The expansion and contraction of the negative electrode mixture (112 of FIG. 3) in the Y-axis direction may be dealt with by the contraction and expansion of the first support portion 1411 in the Y-axis direction. The expansion and contraction of the negative electrode mixture (112 of FIG. 3) in the X-axis direction may be dealt with by the contraction and expansion of the first expansion portion 1412 in the X-axis direction.

When the negative electrode mixture (112 of FIG. 3) expands in the X-axis direction, the first expansion portion 1412 may be pressurized by the negative electrode mixture (112 of FIG. 3) to contract in the X-axis direction. However, when the negative electrode mixture (112 of FIG. 3) contracts in the X-axis direction, the first expansion portion 1412 may elastically recovered by elasticity of the first guide member 141 to expand in the X-axis direction, rather than expand while being stretched by the negative electrode mixture (112 of FIG. 3).

In an exemplary embodiment, a length L1 of the external periphery of the first guide member 141 in the X-axis direction may be at least 110 mm. A length L2 of the first support portion 1411 in the X-axis direction may be at least 105 mm. A length (H1 of FIG. 5) of the first guide member 141 in a Z-axis (Z of FIG. 5) direction may be at least 150 mm.

A sum of a length L3 of the first support portion 1411 in the Y-axis direction, a length of the first extension portion 1412a in the Y-axis direction, and a length of the second extension portion 1412b in the Y-axis direction may be at least 150 μm. The length L3 of the first support 1411 in the Y-axis direction may be at least 30 μm.

In this case, an initial thickness of the first current collector (111 of FIG. 3), adhered to the first support portion 1411, in the Y-axis direction may be 5 μm, and an initial thickness of the negative electrode mixture (112 of FIG. 3) coated on the first current collector (111 of FIG. 3) in the Y-axis direction may be 55 μm.

Figure 8:
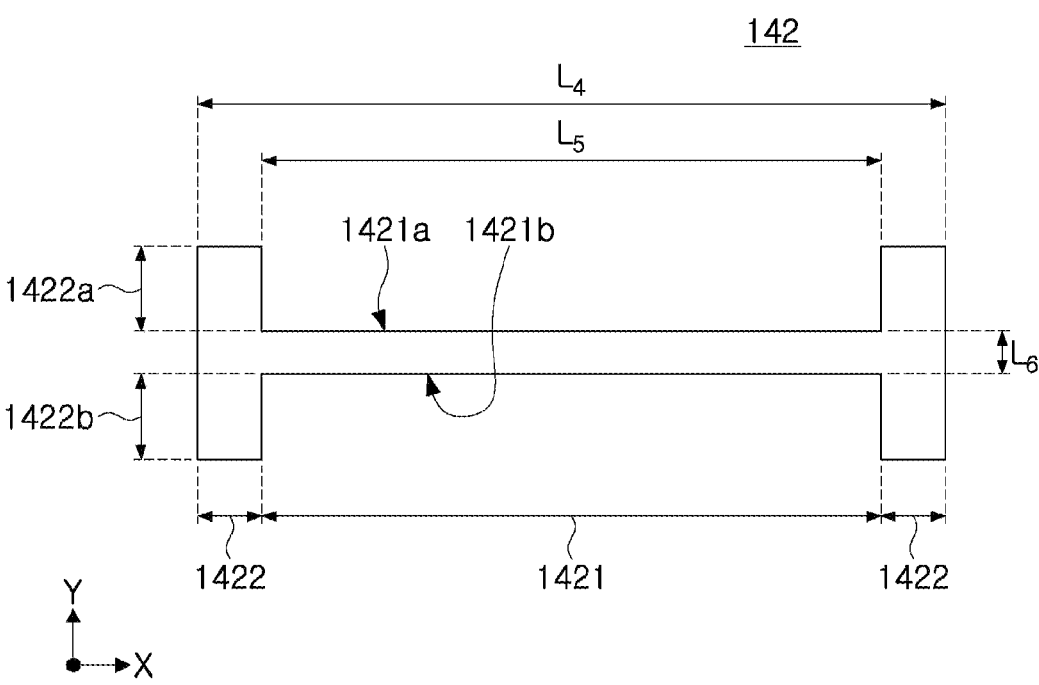
FIG. 8 is a plan view of a second guide member according to an exemplary embodiment in the present disclosure.

A plan view of the second guide member 142 is illustrated in FIG. 8.

As illustrated in FIG. 8, the second guide member 142 according to an exemplary embodiment may include a second support portion 1421, to which the second current collector (121 of FIG. 4) is attached, and a plurality of second expansion portions 1422 extending from the second support portion 1421.

The plurality of second expansion portions 1422 may extend from one end portion and the other end portion of the second support portion 1421 in a thickness direction of the positive electrode (120 of FIG. 4), respectively.

In an exemplary embodiment, one second current collector (121 of FIG. 4) may be attached to a first surface 1421a of the second support portion 1421, and another second current collector (121 of FIG. 4) maybe attached to a second surface 1421b of the second support portion 1421.

In an exemplary embodiment, the second expansion portion 1422 extending from one end portion of the second support portion 1421 may include a first extension portion 1422a, extending from the second support portion 1421 in a positive Y-direction, and a second extension portion 1422b extending from the second support portion 1421 in a negative Y-direction. This is a matter which may be equally applied to another second expansion portion 1422 extending from the other end portion of the second support portion 1421.

In an initial stage, a stage before volume deformation of the electrode assembly (100 of FIG. 2), an absolute value of a length of the first extension portion 1422a in a Y-axis direction and a length of the second extension portion 1422b in the Y-axis direction may be equal to a sum of a thickness of the second current collector (121 of FIG. 4) and a thickness of the positive electrode mixture (122 of FIG. 4).

A thickness of the second current collector (121 FIG. 4) attached to the first surface 1421a of the second support portion 1421 and a thickness of the second collector (121 of FIG. 4) attached to the second surface 1421b of the second support portion 1421 may be equal to each other, and thicknesses of the positive electrode mixture (122 of FIG. 4) applied to the respective second current collectors (121 of FIG. 4) may also be equal to each other.

Therefore, the first extension portion 1422a and the second extension portion 1422b may be in continuous contact with the second current collector (121 of FIG. 4) and the positive electrode mixture (122 of FIG. 4). Accordingly, a contact surface between the second guide member 142 and the positive electrode (120 of FIG. 4) may be increased, and binding force between the second guide member 142 and the positive electrode (120 of FIG. 4) may be enhanced. In addition, expansion and contraction of the positive electrode mixture (122 of FIG. 4) may be more easily dealt with.

The expansion and contraction of the positive electrode mixture (122 in FIG. 4) in the Y-axis direction may be dealt with by the contraction and expansion of the second support portion 1421 in the Y-axis direction. The expansion and contraction of the positive electrode mixture (122 of FIG. 4) in the X-axis direction may be dealt with by the contraction and expansion of the second expansion portion 1422 in the X-axis direction.

When the positive electrode mixture (122 of FIG. 4) expands in the X-axis direction, the second expansion portion 1422 may be pressurized by the positive electrode mixture (122 of FIG. 4) to contract in the X-axis direction. However, when the positive electrode mixture (122 of FIG. 4) contracts in the X-axis direction, the second extension portion 1422 may be elastically recovered by elasticity of the second guide member 142 to expand in the X-axis direction, rather than expand while being stretched by the positive electrode mixture (122 of FIG. 4).

In an exemplary embodiment, a length L4 of an external periphery of the second guide member 142 in the X-axis direction may be at least 110 mm. A length L5 of the second support portion 1421 in the X-axis direction may be at least 100 mm. A length (H2 of FIG. 6) of the second guide member 142 in the Z-axis (Z of FIG. 6) direction may be at least 150 mm.

A sum of a length L6 of the second support portion 1421 in the Y-axis direction, a length of the first extension portion 1422a in the Y-axis direction, and a length of the second extension portion 1422b in the Y-axis direction may be at least 150 μm. A length L6 of the second support portion 1421 in the Y-axis direction may be at least 30 μm.

As described above, in an exemplary embodiment, the first guide member (141 of FIG. 7) and the second guide member 142 may have the same length value in a width direction (an X-axis direction) of the negative electrode (110 of FIG. 2), and the first guide member (141 of FIG. 7) and the second guide member 142 may have the same maximum thickness value in a thickness direction (a Y-axis direction) of the negative electrode (110 of FIG. 2).

In an exemplary embodiment, a maximum thickness value of the first support portion (1411 of FIG. 7) of the first guide member (141 of FIG. 7) in the Y-axis direction may be equal to a maximum thickness value of the second support portion 1421 of the second guide member 142 in the Y-axis direction.

In general, a width of the negative electrode (110 of FIG. 2) (the X-axis direction of FIG. 2) is greater than a width of the positive electrode (120 of FIG. 2) (in the X-axis direction of FIG. 2). Accordingly, when a length of the negative electrode (110 in FIG. 2) of the external periphery of the first guide member (141 of FIG. 2) and the second guide member (142 in FIG. 2) is set to a length of the negative electrode (110 of FIG. 2), a stacking operation and an aligning operation of the negative electrode (110 of FIG. 2) and the positive electrode (120 of FIG. 2) may be completed by only stacking the first guide member (141 of FIG. 2) and the second guide member (142 of FIG. 2).

In an exemplary embodiment, a difference value between the width of the positive electrode (120 of FIG. 2) and the width of the negative electrode (110 of FIG. 2) may be compensated for by the fact that a width of the second expansion portion (1422 of FIG. 10) supporting the positive electrode (120 of FIG. 2) is greater than a width of the first expansion portion 1412 supporting the negative electrode (110 of FIG. 2).

Accordingly, the external periphery of the first guide member (141 of FIG. 2) and the second guide member (142 of FIG. 2) may only be disposed on the same line in the Y-axis (Y of FIG. 2) direction to complete alignment and centering of the negative electrode (110 of FIG. 2)) and the positive electrode (120 of FIG. 2).

In addition, the negative electrode (110 of FIG. 2) may be maintained in a state of close contact with the first guide member (141 of FIG. 2) and the positive electrode (120 of FIG. 2) may be maintained in a state in close contact with the second guide member (142 of FIG. 2), so that the expansion and contraction of the negative electrode (110 of FIG. 2) and the positive electrode (120 of FIG. 2) may be completely transferred to the first guide member (141 of FIG. 2) and the second guide member (142 of FIG. 2).

Figure 9:
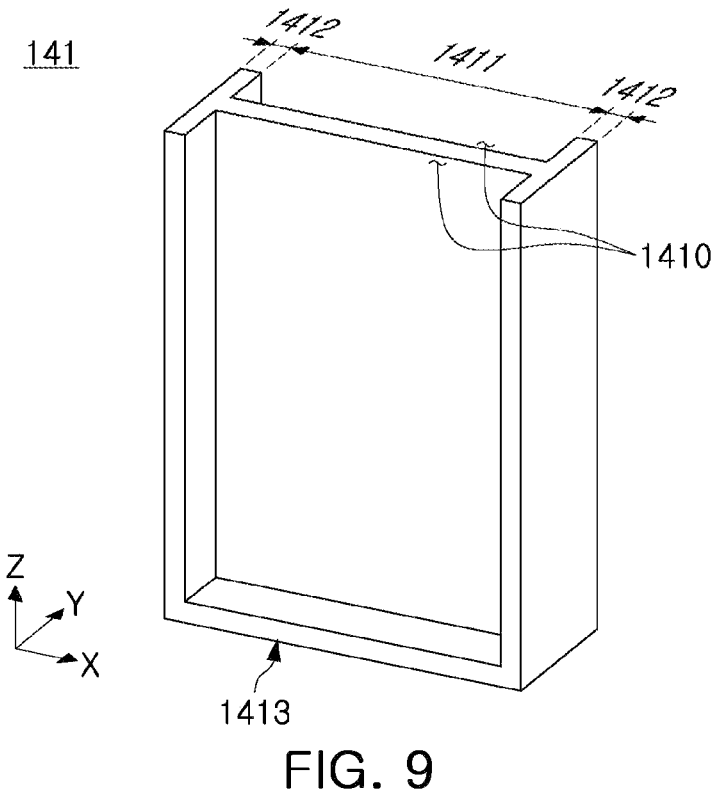
FIG. 9 is a perspective view of a first guide member according to another exemplary embodiment in the present disclosure.

A first guide member 141 according to another exemplary embodiment is illustrated in FIG. 9.

As illustrated in FIG. 9, the first guide member 141 according to another exemplary embodiment may further include a first lower support portion 1413 supporting a lower portion of the negative electrode (110 of FIG. 2). The first lower support portion 1413 may be in contact with a lower portion of the negative electrode (110 of FIG. 2) accommodated in a first accommodation groove 1410.

Accordingly, the first guide member 141 may more easily support the negative electrode (110 of FIG. 2), binding force between the first guide member 141 and the negative electrode (110 of FIG. 2) may be enhanced, and the first guide member 141 may more easily deal with expansion and contraction of the negative electrode (110 of FIG. 2).

In an exemplary embodiment, a thickness of the first lower support portion 1413 in the Y-axis direction may be at least 60 μm. The first lower support portion 1413 may be formed on both one surface and the other surface of the first support portion 1411.

Figure 10:
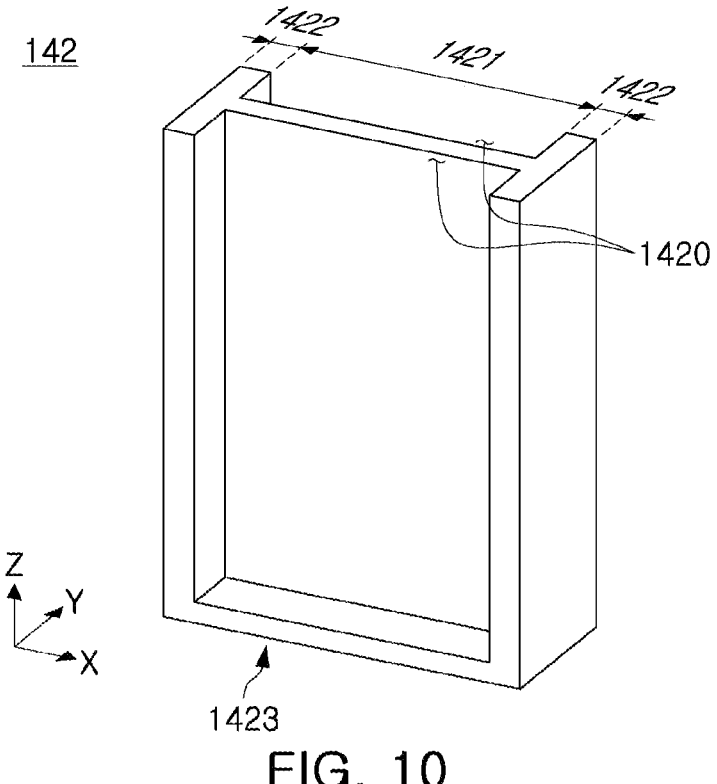
FIG. 10 is a perspective view of a second guide member according to another exemplary embodiment in the present disclosure.

A second guide member 142 according to another exemplary embodiment is illustrated in FIG. 10.

As illustrated of FIG. 10, the second guide member 142 according to another exemplary embodiment may further include a second lower support portion 1423 supporting a lower portion of the positive electrode (120 of FIG. 2). The second lower support portion 1423 may be in contact with a lower portion of the positive electrode (120 of FIG. 2) accommodated in a second accommodation groove 1420.

Accordingly, the second guide member 142 may more easily support the positive electrode (120 of FIG. 2), binding force between the second guide member 142 and the positive electrode (120 of FIG. 2) may be enhanced, and the second guide member 142 may more easily deal with expansion and contraction of the positive electrode (120 of FIG. 2).

In an exemplary embodiment, a thickness of the second lower support portion 1423 in a direction, parallel to a Y-axis, may be at least 60 μm. The second lower support portion 1423 may be formed on both one surface and the other surface of the second support portion 1421.

In an exemplary embodiment, at least one of the first lower support portion (1413 of FIG. 9) and the second lower support portion 1423 may be provided.

A total thickness of the negative electrode mixture (112 of FIG. 2) may increase by about 10 to 20%, as compared with an initial thickness, while a state of charge (SOC) changes 0% to 100%. SOC 0%, a state of charge of 0%, refers to a fully discharge state. SOC 100%, a state of charge of 100%, refers to a fully charged state. The amount of increasing a total thickness of the negative electrode mixture (112 of FIG. 2) may be further increased as a secondary battery is deteriorated.

Although the amount of increasing the total thickness of the negative electrode mixture (112 of FIG. 2) varies depending on characteristics of an active material and the degree of deterioration of the secondary battery, the total thickness of the negative electrode mixture (112 of FIG. 2) of the secondary battery may be increased to 25% of the initial thickness.

Therefore, when a width of the accommodation space (211 of FIG. 1) of the casing (210 of FIG. 1) in a Y-axis direction is adopted, considering the amount of increasing the total thickness of the negative electrode mixture (112 of FIG. 2) to be a maximum value, the electrode assembly (100 of FIG. 2) may be prevented from deforming an exterior the casing (210 of FIG. 1) even when the total thickness of the negative electrode mixture (112 of FIG. 2) expands by a maximum value. This may be equally applied to matters related to the total thickness of the positive electrode mixture (122 of FIG. 2) as well as the negative electrode mixture (112 of FIG. 2).

Hereinafter, an example embodiment, in which an exterior of the casing (210 of FIG. 1) is not deformed, will be described with reference to FIGS. 1 to 2.

In an exemplary embodiment, a width of the accommodation space (211 of FIG. 1) of the casing (210 of FIG. 1) in the Y-axis direction may have a value of 10 mm or more to 11 mm or less. When a cross-section of the casing (210 of FIG. 1) is not a rectangular, a minimum width, among widths of the casing (210 of FIG. 1) in a direction, parallel to the Y-axis direction, may have a value of 10 mm or more to 11 mm or less. In this case, a thickness of one separator 130 interposed between the negative electrode (110 of FIG. 1) and the positive electrode (120 of FIG. 1) may be at least 15 μm.

When a minimum width, among the widths of the accommodation space (211 of FIG. 1) of the casing (210 of FIG. 1) in the Y-axis direction, has a value of 10 mm or more to 11 mm or less and a standard of the first guide member (141 of FIG. 7) is the same as described with reference to FIG. 7, a total of 31 first guide members (141 of FIG. 7) may be stacked inside the casing (210 of FIG. 1). A pair of negative electrodes (110 of FIG. 1) may be accommodated on both surfaces of the single first guide members (141 of FIG. 7), respectively.

When a minimum width, among the widths of the accommodating space (211 of FIG. 1) of the casing (210 of FIG. 1) in the Y-axis direction, has a value of 10 mm or more toll mm or less, and a standard of the second guide member (142 of FIG. 8) is the same as described of FIG. 8, a total of 30 second guide members (142 of FIG. 8) may be stacked inside the casing (210 of FIG. 1). A pair of positive electrodes (120 of FIG. 1) may be accommodated on both surfaces of the single second guide members (142 of FIG. 8), respectively. In this case, a total thickness of the separator (130 of FIG. 1), present between each negative electrode (110 of FIG. 1) and each positive electrode (120 of FIG. 1) in the accommodation space (211 of FIG. 1), may be 0.93 mm.

According to the present disclosure, when the SOC of the battery cell (100 of FIG. 1) has a value of 0% or more to 100% or less, the casing (210 of FIG. 1) may be prevented from being deformed by the electrode assembly (100 of FIG. 2).

Therefore, when the SOC of the battery cell (200 of FIG. 1) has a value of 0% or more to 100% or less, the exterior of the casing (210 of FIG. 11) may be prevented from being deformed. This is a matter which may be equally applied even when a state of health (SOH) of the battery cell (200 of FIG. 1) is 100% or less to 60% or more.

The SOH value is a value indicating a state of lifespan of a battery cell, and a unit thereof may be represented by [%]. The SOH value is a value which may be estimated using voltage, temperature, and current values of the battery cell, rather than a quantitatively measurable value. A decrease in the SOH value means that, when the battery cell is fully charged, a value of output current is decreased with respect to an initial value.

In the present invention, when the SOC value is 0 or more to 100% or less even in a case in which a lifespan of a battery cell is decreased by 40% with respect to an initial lifespan, expansion and contraction of the negative electrode (110 of FIG. 1) and the positive electrode (120 of FIG. 1) may be dealt with without deformation of the casing (210 of FIG. 1). Thus, the lifespan of the battery cell (200 of FIG. 1) may extend.

In another aspect of the present disclosure, a battery module including a battery cell is provided.

Figure 11:
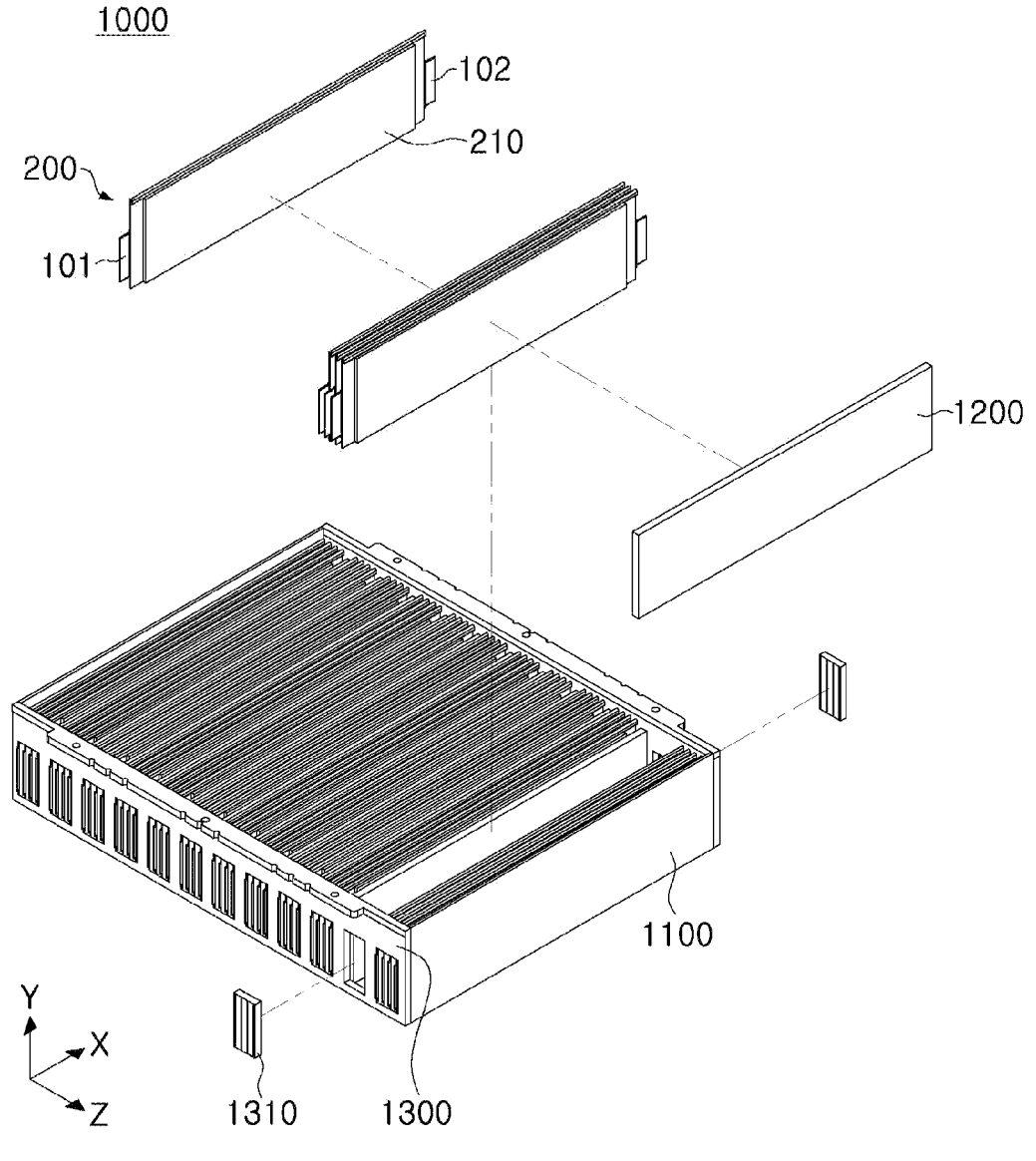
FIG. 11 is an exploded perspective view of a battery module according to an exemplary embodiment in the present disclosure.

An exploded perspective view of a battery module 1000 according to an exemplary embodiment is illustrated in FIG. 11.

As illustrated in FIG. 11, the battery module 1000 according to an exemplary embodiment may include a plurality of battery cells 200. The plurality of battery cells 200 may be accommodated in a module housing 1100. The module housing 1100 may be formed of a material having rigidity, higher than or equal to a predetermined level, and a shape thereof may be maintained while accommodating the battery cell 200 therein.

The plurality of battery cells 200 may be stacked inside the module housing 1100, and a pad 1200 may be provided between the battery cells 200.

The pad 1200 may be brought into contact with the casing 210 of the battery cell 200 to provide surface pressure. In addition, in an exemplary embodiment, when the pad 1200 is formed of a material having high thermal conductivity, surface pressure may be provided and a cooling function of the casing 210 may be simultaneously performed.

A negative electrode tab 101 of the battery cell 200 may be led out to one side of the casing 210 of the battery cell 200, and a positive electrode tab 102 may be led out from the other side thereof. A direction, in which the negative electrode tab 101 and the positive electrode tab 102 are led out from the casing 210, is not limited by the present disclosure, and the negative electrode tab 101 and the positive electrode tab 102 may have a form led out to only one side of the casing 210.

The negative electrode tab 101 and the positive electrode tab 102 may be welded to a busbar member 1310, provided in a busbar frame 1300, and may be electrically connected to the busbar member 1310. The busbar frame 1300 may be fixed to one side of the module housing 1100, and may support the busbar member 1310. The busbar frame 1300 may be formed of a material including an insulating material.

In an exemplary embodiment, the casing 210 of the battery cell 200 maybe a pouch-type casing. An external surface of the casing 210 may be formed of a material including an aluminum alloy, and an internal surface of the casing 210 may be formed of a material including polypropylene.

The negative electrode (110 of FIG. 1), the positive electrode (120 of FIG. 1), the separator (130 of FIG. 1), the first guide member (141 of FIG. 1), and the second guide member (FIG. 1) 142) may be stacked inside the casing 210, and the casing 210 may be thermally fused to seal the accommodation space (211 of FIG. 1). In this case, the accommodation space (211 of FIG. 1) may be filled with an electrolyte solution.

As described above, when at least one of the negative electrode (110 of FIG. 1) and the positive electrode (120 of FIG. 1) expands or contracts, at least one of the first guide member (141 of FIG. 1) and the second guide member (142 of FIG. 1) may contract or expand to deal with a change in volume of at least one of the negative electrode (110 of FIG. 1) and the positive electrode (120 of FIG. 1).

In this case, the module housing 1100 has at least a predetermined level of rigidity, so that casings 210 of the battery cells 200 may be maintained in a state of being brought into close contact with each other in a Z-axis direction or the casing 210 and the pad 1200 may be maintained in a state of being brought into close contact with each other in the Z-axis direction, inside the module housing 1100. Accordingly, the casing 210 may be supported by the module housing 1100 or the pad 1200 in a direction, parallel to the Z-axis.

Therefore, in the battery module 1000 according to an exemplary embodiment, a change in volume of the negative electrode (110 of FIG. 1), the positive electrode (120 of FIG. 1), the first guide member (141 of FIG. 1), and the second guide member (142 of FIG. 1) may be allowed to occur in the Z-axis direction, and the external surface of the casing 210 may not be changed in the Z-axis direction in spite of the change in volume thereof in the Z-axis direction.

Moreover, in another exemplary embodiment, the battery module 1000 may be provided with a plurality of the battery modules 1000, and the plurality of battery modules 1000 may be accommodated in a pack housing (not illustrated) to form a battery pack (not illustrated).

As described above, assembly efficiency of a battery cell and assembly efficiency of a battery module and a battery pack may be improved.

In addition, expansion and contraction of an electrode may be controlled inside a casing in which the electrode is accommodated.

In addition, an exterior of an external material, accommodating an electrode assembly, may be prevented from being deformed even when charging and discharging are repeated.

While example embodiments have been shown and described above, it will be apparent to those skilled in the art that modifications and variations could be made without departing from the scope of the present invention as defined by the appended claims.

The invention claimed is:

1. A battery cell comprising:
   a casing having an accommodation space; and
   an electrode assembly accommodated in the accommodation space and contacting the casing, wherein the electrode assembly comprises:

a negative electrode including a first current collector and a negative electrode mixture applied to the first current collector;

a positive electrode including a second current collector and a positive electrode mixture applied to the second current collector;

a separator interposed between the positive electrode and the negative electrode; and a guide member accommodating at least one of the negative electrode and the positive electrode and pressurized or stretched by at least one of the negative electrode and the positive electrode to contract or expand, wherein the guide member comprises:

a first guide member accommodating the negative electrode; and a second guide member accommodating the positive electrode, and the separator is disposed between the first guide member and the second guide member.

2. The battery cell of claim 1, wherein the first guide member has a first accommodation groove in which the negative electrode is accommodated, the second guide member has a second accommodation groove in which the positive electrode is accommodated, and the first guide member and the second guide member have at least one surface contacting each of the negative electrode and the positive electrode.

3. The battery cell of claim 2, wherein the first guide member and the second guide member include a plurality of first accommodation grooves and a plurality of second accommodation grooves, respectively, and the negative electrode and the positive electrode are provided with a plurality of negative electrodes and a plurality of positive electrodes corresponding to the first accommodation grooves and the second accommodation grooves in one-to-one correspondence to be accommodated in the first accommodation groove and the second accommodation groove, respectively.

4. The battery cell of claim 1, wherein the first guide member comprises:

a first support portion to which the first current collector is attached; and a first expansion portion extending from the first support portion in a thickness direction of the negative electrode, and the second guide member comprises:

a second support portion to which the second current collector is attached; and a second expansion portion extending from the second support portion in a thickness direction of the positive electrode.

5. The battery cell of claim 4, wherein the first current collector is provided with a plurality of first current collectors to respectively be attached to opposite surfaces of the first support portion, and the second current collector is provided with a plurality of second current collectors to respectively be attached to opposite surfaces of the second support portion.

6. The battery cell of claim 5, wherein the first expansion portion extends from each of one side and the other side of the first support portion in a thickness direction of the negative electrode, and the second expansion portion extends from each of one side and the other side of the second support portion in a thickness direction of the positive electrode.

7. The battery cell of claim 6, wherein the first guide member further includes a first lower support portion supporting a lower portion of the negative electrode, and the second guide member further includes a second lower support portion supporting a lower portion of the positive electrode.

8. The battery cell of claim 1, wherein length values of the first guide member and the second guide member in a width direction of the negative electrode are the same, and maximum thickness values of the first guide member and the second guide member in a thickness direction of the negative electrode are the same.

9. The battery cell of claim 1, wherein the first guide member and the second guide member are formed of a material including conductive plastic having porosity of 50% or more to 70% or less.

10. The battery cell of claim 1, wherein the first guide member and the second guide member are formed of a material including polyacetylene.

11. The battery cell of claim 1, wherein the first guide member and the second guide member include a carbon-based filler.

12. A battery module comprising:

a module housing accommodating the battery cell of claim 1.

13. The battery module of claim 12, wherein the battery cell is provided with a plurality of battery cells to be stacked in the module housing, and is supported by the module housing.

14. The battery module of claim 13, further comprising:

at least one pad disposed between a pair of adjacent battery cells and contacting the pair of adjacent battery cells.

15. The battery module of claim 12, wherein the casing of the battery cell is a pouch casing.

16. The battery module of claim 14, wherein each of the at least one pad is formed of a material having thermal conductivity of 1 W/mK or more to 20 W/mK or less.

\* \* \* \* \*